June 7, 1938.  J. MUROS  2,119,998
SHAVING IMPLEMENT
Filed Nov. 24, 1936
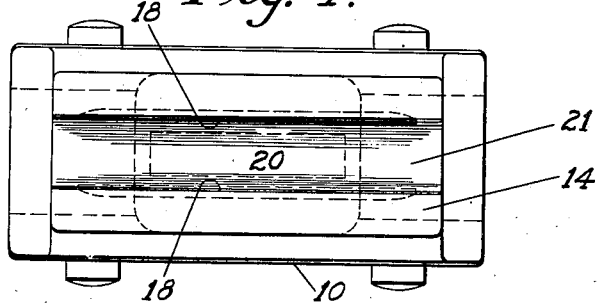
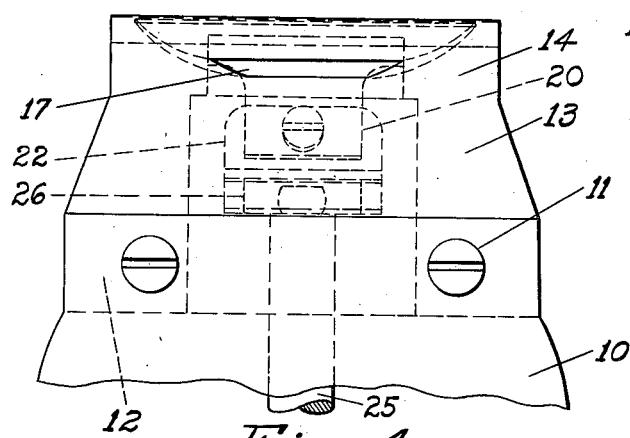
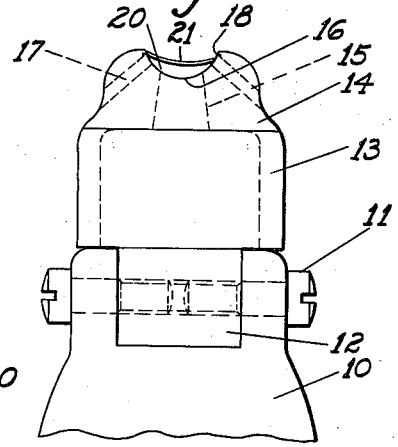
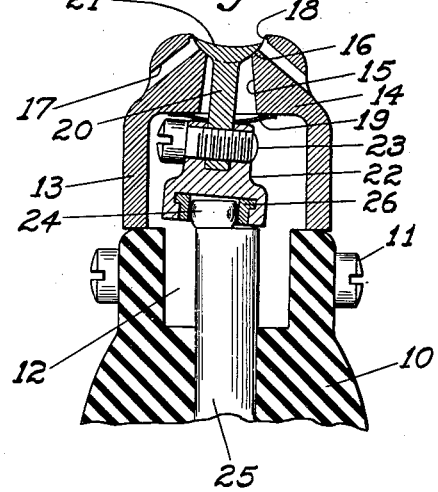
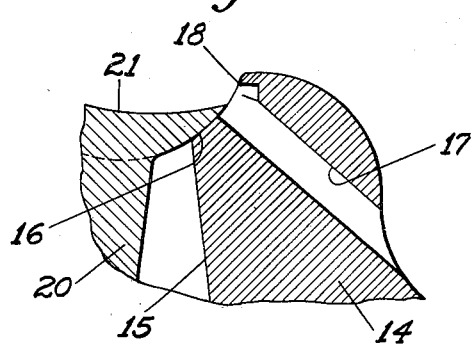
INVENTOR
BY Joseph Muros.
F. W. Kenway.
ATTORNEY Patented June 7, 1938

2,119,998

UNITED STATES PATENT OFFICE 2,119,998

SHAVING IMPLEMENT

Joseph Muros, Cambridge, Mass., assignor to Gillette Safety Razor Company, Boston, Mass., a corporation of Delaware Application November 24, 1936, Serial No. 112,516

12 Claims. (Cl. 30—43)

This invention relates to implements employing co-operating cutting or shearing members for shaving without the use of lather. In one aspect it consists in a novel combination comprising a guard member having opposed cutting edges of substantial length and a rocking cutter located between them and having co-operating oppositely directed cutting edges. In another aspect the invention consists in improvements upon the implement of my co-pending application, Serial No. 104,967, filed October 10, 1936, now Patent No. 2,077,805 granted April 20, 1937, with a view especially to adapting for shaving the general-purpose cutting implement therein disclosed.

As herein shown the implement of my invention comprises a guard member in which opposed cutting edges are formed in part by an open cylindrical groove in its face. The cylindrical groove, or a portion thereof, forms a concave seat in which may be mounted a rocking cutter and this seat acts to define and control the movement of the cutter as it is rocked into cutting or shearing relation alternately with the respective edges of the stationary member. An implement of these characteristics presents the advantage of cutting edges of substantial length so arranged as to be effective from one end to the other when the implement is moved upon the face of the user in a direction normally to the edge or at an angle thereto. Accordingly, all the cutting edge is ineffective in the movement of the implement as would be the case in respect to any portion of a differently shaped edge that might extend in line with the direction of movement. On the contrary, the implement presents a long straight cutting edge which is completely effective and not impaired in its effectiveness by guard teeth or the like.

The implement may be so shaped as to present two elongated contact or guard faces spaced from each other and located on opposite sides of the rocking cutter. A particularly safe organization is derived by locating the cutter between such spaced guard faces and making its exposed face concave and of substantially the natural curvature of the surface of the user's face when the implement is applied thereto, that is to say, the contour of the cutter follows the natural bulge of the skin between the two guard surfaces so that the point or line of cutting is brought close to the surface of the skin and the hair sheared with little or no stubble.

Other features of the invention relate more especially to mechanical details of the mechanism for maintaining the guard and cutter always in operative relation and for imparting to the cutter the desired rocking movement in a predetermined path.

These and other features of the invention will be best understood and appreciated from the following description of a preferred embodiment thereof, selected for purposes of illustration and shown in the accompanying drawing, in which:—

Fig. 1 is a plan view of the implement as seen from above;

Fig. 2 is a view in front elevation with portions of the implement shown as broken away;

Fig. 3 is a similar view of the implement in elevation, as seen at right angles to the view shown in Fig. 2;

Fig. 4 is a central cross-sectional view corresponding to that shown in Fig. 3;

Fig. 5 is a fragmentary view in cross-section on an enlarged scale.

The implement includes in its structure an elongated body 10 of molded material which serves as a handle and also houses the motor, not shown, but which it includes or is connected with, the rotary shaft 25 shown in Fig. 4. The body 10 is provided in its upper end with flanges spaced to receive between them the reduced shank portion 12 of the guard member or casing in which are formed the stationary shearing edges of the implement. These flanges may be drawn into clamping relation upon the shank portion 12 by transverse screws 11 which extend into them at each end.

The guard member herein shown comprises a steel casing having the reduced, hollow shank portion 12 which merges into a hollow intermediate body portion 13 and this in turn merges into an upper portion 14 somewhat reduced in width as compared to the body portion of the casing and having rounded longitudinal edges. In the upper face of the portion 14 is formed a straight longitudinal semi-cylindrical groove, the concave surface 16 of which forms a semi-cylindrical seat and in fact defines or bounds opposed parallel cutting edges 18. A pair of diverging slots 17 extend obliquely from opposite sides of the seat 16 downwardly and outwardly through the side walls of the portion 14 of the casing. The slots 17 are curved at either end, as shown in Fig. 2, being formed by a circular milling tool, and serve as passages for the shaving or shearing debris. The upper portion 14 of the casing is also provided with a centrally disposed downwardly extending passage 15 having diverging walls and being arranged to contain the shank of the rocking cutter, as will be presently explained. The opposed cutting edges 18 are formed by the juncture of the concave semi-cylindrical surface 16 with longitudinal slots which coincides at their central points with the opening of the passages 17 through the wall of the semi-cylindrical seat 16, as best shown in Fig. 5. The curvature of the seat 16 need not be exactly 180° and the term "semi-cylindrical" is used to designate any suitable cylindrical segment.

The movable cutter of the implement comprises an elongated member having an upwardly directed concave face 21, a body portion with a semi-cylindrical downwardly convex surface fitting the seat 16 and a downwardly extending shank 20 that is to say, a shank extending radially away from the center of curvature of the seat 16. The shank 20 is secured at its lower end, by means of a transverse screw 23, to a connecting member 22 which has a longitudinal channel in its lower face in which a slide member 26 is freely movable in endwise direction. Within the slide 26 is received an eccentric head 24 which projects upwardly from the end of the driving shaft 25 and fits in a hole in the slide 26 so as to impart in its rotation a transverse oscillation to the cutter, while its longitudinal component of movement is disposed of as lost motion between the slide 26 and the connecting member 22. A leaf spring 19 upwardly concave in shape is maintained in tension between the lower wall of the portion 14 and the intermediate connecting member 22 of the cutter assembly. The spring 19, therefore, tends at all times to hold the cutter member firmly and yieldingly upon its seat 16.

In Figs. 4 and 5 the eccentric head 24 is shown as occupying its extreme left-hand position and, accordingly, the cutter member is rocked so that its right-hand cutting edge stands somewhat below the right-hand cutting edge 18 of the stationary or guard member of the implement. In each revolution of the shaft 25 a complete oscillation is imparted to the cutter member, that is to say, the right-hand cutting edge is first moved upwardly and outwardly into shearing relation with the right-hand cutting edge 18 of the stationary casing and then the left-hand edge is similarly moved into similar relation with the left-hand cutting edge of the stationary casing. This oscillation takes place at an extremely rapid rate, the motor running, for example, at six thousand R. P. M. and the implement being meanwhile moved across the face of the user with its end face in contact therewith. The result is that all hair which enters the spaces beneath the edges 18 is sheared off very close to the face and the debris naturally falls into one or other of the exit channels 17 and so passes out from the implement without the possibility of reaching or clogging in movable parts thereof. The parallel contact faces of the upper portion 14 of the casing engage the face of the user and act as guards to prevent cutting. The concave face 21 of the cutter permits the skin to bulge somewhat and thus tends to direct the hairs into the opening appearing alternatively beneath the cutting edges 18 and to bring the shearing edges very close to the face of the user without any danger of cutting.

The embodiment of my invention herein shown includes a rocking cutter located entirely within the confines of the stationary or guard member 13—14 and so arranged that its edges move upwardly and outwardly in effecting the cutting operation. It would be within the scope of the invention, however, to employ a cutter having an external body portion with cutting edges arranged to move downwardly and inwardly in effecting the cutting operation.

Further, the cutter herein shown has an upper face which is substantially flat from end to end, although concave transversely, and cutting edges which are parallel at all times to the stationary cutting edges. It is contemplated, however, that if desired this upper face may be inclined slightly in a longitudinal sense to impart an oblique direction to the cutting edges. This has the effect of slightly tapering the cutter and giving one end of its cutting edges a lead in reaching the stationary edges 18. It will be noted as a novel feature of construction that the operating point of connection with the cutter member lies on the opposite side of the cutter from the center of curvature of the seat 16 or of the cylindrical surface of the body of the cutter.

Having thus described my invention and shown one of its embodiments by way of example and not limitation, what I claim as new and desire to secure by Letters Patent is:—

1. An implement of the class described comprising a guard member having a concave surface bounding straight, parallel cutting edges of substantial length and disposed in opposed relation, in combination with a rocking cutter located between them and having co-operating oppositely directed edges.

2. An implement of the class described having an elongated casing presenting spaced opposed cutting edges and a cylindrical outwardly concave seat, and a co-operating member mounted to rock on said seat and having oppositely directed edges arranged to meet said opposed cutting edges alternately as said member is rocked.

3. An implement of the class described comprising a guard member having an open semi-cylindrical groove in its face bounding parallel opposed cutting edges, a rocking cutter mounted in said groove, and means for oscillating the same.

4. An implement of the class described comprising a member having parallel guard faces separated by an open semi-cylindrical groove bounding opposed cutting edges, a rocking cutter mounted in said groove and having a cylindrical surface bounding oppositely directed cutting edges, and means for oscillating the cutter.

5. An implement of the class described comprising a member having spaced guard faces separated by a semi-cylindrical groove bounded at opposite sides by cutting edges, an oscillatory cutter retained within said groove and presenting straight line cutting edges arranged to be moved alternately into shearing relation with one or the other of the cutting edges of the guard member, and means for oscillating the cutter.

6. An implement of the class described comprising a stationary member having a concave recess bounding spaced straight line cutting edges and channels opening into said recess at a level below said cutting edges, and an oscillatory cutter mounted in said recess and movable to uncover said channels alternately.

7. An implement of the class described comprising a stationary member having a concave recess therein with cutting edges and contact faces at either side thereof, an oscillatory cutter mounted in said recess, an eccentric, and a connection between said eccentric and cutter arranged to impart rocking movement in a unidirectional path to said cutter.

8. An implement of the class described comprising a guard member having a cylindrical seat therein with cutting edges and adjacent contact faces, an oscillatory cutter located in said recess, an eccentric arranged to rotate on an axis disposed at right angles to the axis of the cutter, and a connecting member having a channel extending parallel to the axis of the cutter.

9. An implement of the class described comprising a stationary member having a cylindrical recess therein forming a cutter seat and parallel grooves opening into each side of the recess and defining opposed cutting edges therein, and a cutter arranged to rock upon said seat in co-operation with said cutting edges.

10. A dry shaving implement comprising an elongated guard member having straight continuous cutting edges arranged in opposed relation and an intermediate cylindrical seat disposed at a lower level than said edges, and a cutter arranged to rock on said seat and having a concave upper face bounded by oppositely directed cutting edges which are movable with the cutter in a general upward and outward direction to co-operate in shearing with the cutting edges of the guard member.

11. A dry shaving implement including in its structure a guard member having an elongated concave seat with straight cutting edges at either side, a cutter arranged to rock on said seat and having a shank extending away from the center of curvature of the seat, and means connected to said shank to oscillate the cutter.

12. A dry shaving implement including in its structure a guard member having an open concave cylindrical seat bounded by opposed cutting edges, a cutter having a cylindrical body arranged to rock in said seat, and operating mechanism connected to the cutter upon that side opposite to the center of curvature of its cylindrical body.

JOSEPH MUROS.